(12) United States Patent
Hassan et al.

(10) Patent No.: US 8,518,186 B2
(45) Date of Patent: Aug. 27, 2013

(54) SYSTEM AND PROCESS FOR STARCH PRODUCTION

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

(21) Appl. No.: 12/142,120

(22) Filed: Jun. 19, 2008

(65) Prior Publication Data
US 2009/0005552 A1 Jan. 1, 2009

Related U.S. Application Data

(60) Provisional application No. 60/946,471, filed on Jun. 27, 2007.

(51) Int. Cl.
*C08B 30/04* (2006.01)
(52) U.S. Cl.
CPC ....................................... *C08B 30/04* (2013.01)
USPC ................... 127/67; 127/68; 127/24
(58) Field of Classification Search
USPC .............................................. 127/67, 68, 24
See application file for complete search history.

(56) References Cited

U.S. PATENT DOCUMENTS

| | | | |
|---|---|---|---|
| 2,132,251 A | 10/1938 | Wagner | |
| 3,781,320 A | 12/1973 | Irwin | |
| 3,887,167 A | 6/1975 | Irwin | |
| 3,909,288 A | 9/1975 | Powell et al. | |
| 4,517,022 A * | 5/1985 | Harvey | 127/68 |
| 4,724,269 A | 2/1988 | Suzki et al. | |
| 4,886,905 A | 12/1989 | Larkins, Jr. | |
| 4,914,029 A | 4/1990 | Caransa et al. | |

(Continued)

FOREIGN PATENT DOCUMENTS

| CA | 2679836 | 3/2012 |
|---|---|---|
| EP | 1604969 A | 12/2005 |

(Continued)

OTHER PUBLICATIONS

Lopes-Filho, J.F. et al., Cereal Chemistry "Intermittent Milling and Dynamic Steeping Process for Corn Starch Recovery", (1997), vol. 74, issue 5, abstract.*

(Continued)

*Primary Examiner* — David M Brunsman
(74) *Attorney, Agent, or Firm* — Timothy S. Westby; Porter Hedges LLP

(57) ABSTRACT

Use of a high shear mechanical device in a process for production of starch by hydration and disruption of corn kernel particles in the presence of sulfur dioxide or bisulfite ions makes possible a decrease in mass transfer limitations, thereby enhancing starch production. A system for production of starch is also provided in which a high shear mixing device is configured to receive an aqueous corn slurry from a pump that is disposed between the reactor and a gaseous sulfur dioxide inlet of the high shear mixing device. The high shear mixing device is also configured to generate a fine dispersion of sulfur dioxide bubbles and small corn particles in the slurry. A reactor is configured to receive the output from the high shear mixing device and to provide for starch production.

21 Claims, 2 Drawing Sheets

(56) References Cited

U.S. PATENT DOCUMENTS

| | | | |
|---|---|---|---|
| 4,950,831 A | 8/1990 | Staton et al. |
| 5,009,816 A | 4/1991 | Weise et al. |
| 5,248,484 A | 9/1993 | Scott et al. |
| 5,264,087 A | 11/1993 | Lowery et al. |
| 5,382,358 A | 1/1995 | Yeh |
| 5,451,348 A | 9/1995 | Kingsley |
| 5,498,766 A | 3/1996 | Stuart et al. |
| 5,538,191 A | 7/1996 | Holl |
| 5,710,355 A | 1/1998 | Krishnamurti |
| 5,756,714 A | 5/1998 | Antrim et al. |
| 5,877,350 A | 3/1999 | Langer et al. |
| 6,194,625 B1 | 2/2001 | Graves et al. |
| 6,251,289 B1 | 6/2001 | Sherman |
| 6,368,366 B1 | 4/2002 | Langer et al. |
| 6,368,367 B1 | 4/2002 | Langer et al. |
| 6,383,237 B1 | 5/2002 | Langer et al. |
| 6,530,964 B2 | 3/2003 | Langer et al. |
| 6,693,213 B1 | 2/2004 | Kolena et al. |
| 6,742,774 B2 | 6/2004 | Holl |
| 6,768,021 B2 | 7/2004 | Horan et al. |
| 6,787,036 B2 | 9/2004 | Long |
| 6,809,217 B1 | 10/2004 | Colley et al. |
| 2003/0043690 A1 | 3/2003 | Holl |
| 2004/0052158 A1 | 3/2004 | Holl |
| 2004/0187863 A1 | 9/2004 | Langhauser |
| 2005/0033069 A1 | 2/2005 | Holl et al. |
| 2006/0245991 A1 | 11/2006 | Holl et al. |
| 2006/0272634 A1 | 12/2006 | Nehmer et al. |

FOREIGN PATENT DOCUMENTS

| | | |
|---|---|---|
| JP | 61183235 A | 8/1986 |
| JP | 2000143706 A | 5/2000 |
| JP | 2002003505 A | 1/2002 |
| JP | 2002121353 A | 4/2002 |
| JP | 2007505201 A | 3/2007 |
| WO | 9843725 A | 10/1998 |
| WO | 02064708 | 8/2002 |
| WO | 03041848 | 5/2003 |
| WO | 2005108533 A2 | 11/2005 |
| WO | 2007023864 Y | 3/2007 |

OTHER PUBLICATIONS

International Search Report, International Application No. PCT/US2008/067833, dated Jan. 13, 2009.
Office Action dated May 23, 2013 for corresponding U.S. Appl. No. 12/533,893 (10 pgs.).
Office Action Dated Apr. 20, 2010 for U.S. Appl. No. 12/411,660.
Office Action Dated Apr. 20, 2010 for U.S. Appl. No. 12/427,286.
Office Action Dated Apr. 23, 2010 for U.S. Appl. No. 12/568,155.
Office Action Dated Apr. 27, 2010 for U.S. Appl. No. 12/568,280.
Office Action Dated May 5, 2010 for U.S. Appl. No. 12/142,120.
Office Action Dated Jun. 25, 2009 for U.S. Appl. No. 12/142,447.
Office Action Dated Jan. 7, 2010 for U.S. Appl. No. 12/142,447.
Office Action Dated May 13, 2010 for U.S. Appl. No. 12/142,447.
Office Action Dated Feb. 4, 2010 for U.S. Appl. No. 12/492,721.
Office Action Dated Feb. 18, 2010 for U.S. Appl. No. 12/635,433.
Office Action Dated Feb. 18, 2010 for U.S. Appl. No. 12/635,454.
Office Action Dated May 14, 2010 for U.S. Appl. No. 12/137,441.
Office Action Dated Feb. 19, 2010 for U.S. Appl. No. 12/144,459.
Office Action Dated Sep. 2, 2009 for U.S. Appl. No. 12/142,433.
Office Action Dated Jan. 29, 2010 for U.S. Appl. No. 12/142,433.
Office Action Dated May 24, 2010 for U.S. Appl. No. 12/142,433.
Office Action Dated Apr. 30, 2010 for U.S. Appl. No. 12/141,191.
Office Action Dated Oct. 27, 2009 for U.S. Appl. No. 12/142,120.
Office Action Dated May 5, 2010 for U.S. Appl. No. 12/571,537.
"Caviation: A technology of the horizon," Current Science 91 (No. 1): 35-46 (2006).
IKA-Rotor-Stator-Generators-2003 Processing Catalog (38pgs).
U.S. Office Action dated Dec. 14, 2011 for corresponding U.S. Appl. No. 12/533,893.
European Search Report dated Oct. 2, 2012 for corresponding European Application No. 08771702.1 (7 pgs.).
Office Action dated Dec. 26, 2012 for corresponding U.S. Appl. No. 12/533,893 (8 pgs.).
Office Action for U.S. Appl. No. 12/533,893 dated May 31, 2012.
Canadian Office Action dated Dec. 14, 2010 for corresponding Canadian Patent Application No. 2,679,836 (2 pgs.).
Lopes-Filho et al., "Intermittent Milling and Dynamic Steeping Process for Corn Starch Recovery", Cereal Chemistry, vol. 74, No. 5, 1997, pp. 633-638 (6 pgs.).
"Introduction to IKS's Three State Dispax Reactor", www.ikausa.com, accessed May 15, 2012 (12 pgs.).
Office Action dated Feb. 24, 2011 for U.S. Appl. No. 12/796,358.
Office Action dated Feb. 29, 2012 for U.S. Appl. No. 12/146,733.
Office Action dated Jun. 3, 2011 for U.S. Appl. No. 12/568,155.
Office Action dated Jun. 2, 2011 for U.S. Appl. No. 12/427,286.
Office Action dated Jun. 3, 2011 for U.S. Appl. No. 12/568,280.

* cited by examiner

SYSTEM AND PROCESS FOR STARCH PRODUCTION

CROSS-REFERENCE TO RELATED APPLICATIONS

This application claims the benefit under 35 U.S.C. §119 (e) of U.S. Provisional Patent Application No. 60/946,471, filed Jun. 27, 2007, the disclosure of which is hereby incorporated herein by reference.

STATEMENT REGARDING FEDERALLY SPONSORED RESEARCH OR DEVELOPMENT

Not Applicable.

TECHNICAL FIELD

The present invention generally relates to the production of starch from corn, and more particularly to apparatus and methods for producing starch from corn using sulfur dioxide or bisulfite treatment. Still more particularly, the invention relates to such apparatus and methods which employ high shear mixing to reduce mass transfer limitations.

BACKGROUND

Starch is a mainstay of our food, pharmaceutical, paper, chemical, textile, cosmetic, and energy industries. It serves as a raw material in the manufacture of such basic consumer necessities as paper and textiles, and is also used in sizing, surface coating and adhesives. Corn starches and their derivatives are also used in a variety of other applications, including the manufacture of "drilling muds" that are used to cool oil well drilling bits, and in flocculating agents, anti-caking agents, mold-release agents, dusting powder and thickening agents. A developing market for corn starch is for use as a feedstock for production of a number of industrial chemicals and plastics that heretofore relied on petroleum-derived feedstocks. As the world's petroleum supply dwindles or becomes less reliable, the importance of an abundant renewable natural source of raw material such as corn starch becomes increasingly attractive.

The wet milling process is traditionally used to separate corn into its primary components of starch, germ, fiber and protein. The wet milling processes, for example, generally comprise four basic stages: steeping, germ separation, grinding/screening, and starch-gluten separation. After inspection and cleaning, corn kernels are steeped in a dilute aqueous $SO_2$ solution for 1 to 2 days to soften the corn kernels and begin breaking disulfide bonds in the protein matrix that holds the proteins and starch together. The next step in the process involves a coarse grind to separate the germ from the rest of the kernel. The resulting slurry, consisting of fiber, starch and protein, is finely ground and screened to separate the fiber from the starch and protein. The starch is separated from the remaining slurry in hydrocyclones. The starch can then can be used for making drilling mud, or can be further processed for a variety of other applications.

The steeping operation is a diffusion limited process. During the 24-48 hour soak, the water and $SO_2$ diffuse into the corn kernel through the base end of the tip cap, and then move through the pericarp to the kernel crown and into the endosperm. The absorbed $SO_2$ cleaves the disulfide bonds in the protein matrix that encapsulates the starch granules, dispersing the protein matrix, and enhancing starch release. The time for penetration of $SO_2$ into the endosperm and its reaction time with the protein matrix makes steeping a very time consuming operation in the corn wet-milling process. Steeping times shorter than 24 hours result in poor starch yields and loss of starch to fiber and protein fractions. Steeping is also one of the most capital and energy intensive parts of the corn wet-milling process. Reducing steep time would decrease energy cost, increase plant capacity and reduce the capital cost involved in construction of new corn wet-milling plants.

Several mechanical and chemical approaches have been investigated to decrease steep time while maintaining product yields. Such processes typically require costly modifications of existing facilities or pretreatment of kernels, resulting in increased pollution or increased energy use. It has been said that the development of a processing procedure that could reduce the steep time and decrease or eliminate the use of chemicals such as sulfur dioxide would have a significant impact on the corn wet-milling industry.

Processes in which dehulled and degermed dry-milled corn is mixed with water for a period of not more than 4 hours at ambient temperature to form an aqueous slurry have also been explored. In some cases, the slurry is treated with alkali, and then subjected to certain high intensity mixing to yield a high-quality starch. Sodium sulfite may be present in the alkali-containing slurry. Existing processes and production facilities for producing starch from corn are typically subject to various constraints including mass flow limitations, product yield, plant size and energy consumption. Accordingly, there is continued interest in the development of ways to improve the selectivity and yield of starch from corn.

SUMMARY

A high shear system and process for accelerating starch production from corn is disclosed. Some embodiments of the high shear process make possible a reduction in mass transfer limitations, thereby increasing the rate of hydration of protein matrix and release of starch, enabling a reduction in processing time and an increase in product yield. In accordance with certain embodiments, a process is provided that offers more optimal time, temperature and pressure conditions than are typical of other starch production processes. Embodiments of the disclosed process employ an external high shear mechanical reactor to provide enhanced time, temperature and pressure conditions resulting in accelerated release of starch granules and increased yield of starch.

In accordance with certain embodiments, a method for producing starch is provided which comprises obtaining a high shear mixing device; forming in the high shear mixing device a high shear mixture comprising dehulled and degermed corn kernel particles, sulfur dioxide, and an aqueous medium, wherein the high shear mixture comprises submicron-sized sulfur dioxide-containing bubbles and/or submicron-sized corn kernel particles dispersed in the aqueous medium; and causing the extraction of starch from the dispersed particles and solubilization of the starch in the aqueous medium.

In accordance with certain other embodiments, a system for production of starch is provided which comprises a high shear mixing device having a corn slurry inlet, a sulfur dioxide inlet and a dispersion outlet, wherein the mixing device is configured to produce a dispersion of corn kernel particles and submicron-sized sulfur dioxide bubbles and in an aqueous medium; a reactor configured for receiving the dispersion, and having a slurry outlet and a product outlet; a pump disposed between the slurry outlet and the slurry inlet of the high shear mixing device; and a starch-gluten separator configured for receiving the starch-containing product and separating the starch. These and other embodiments and potential advantages will be apparent in the following detailed description and drawings.

DETAILED DESCRIPTION OF THE PREFERRED EMBODIMENTS

An improved process and system for the production of starch by modified corn wet-milling and starch extraction employs an external high shear mixer to provide rapid mixing and intimate contacting of corn grit with an aqueous $SO_2$ solution in a controlled environment in the high shear mixer. The high shear device reduces mass transfer limitations in the extraction process and thus increases the overall processing rate by speeding hydration of the protein matrix that encapsulates the starch, and causing the release of starch globules. The enhanced contacting of the corn particles with the $SO_2$ solution in a highly dispersed state potentially allows a reduced amount of $SO_2$ to be used in embodiments of the process without sacrificing quality or quantity of the starch product.

Chemical reactions involving liquids, gases and solids rely on the laws of kinetics that involve time, temperature, and pressure to define the rate of reactions. In cases where it is desirable to react two or more raw materials of different phases (e.g., solid and liquid; liquid and gas; solid, liquid and gas), one of the limiting factors in controlling the rate of reaction involves the contact time of the reactants. In conventional reactors, contact time for the reactants is often controlled by mixing, which provides contact with two or more reactants involved in a chemical reaction. A reactor assembly that comprises an external high shear mixer makes possible decreased mass transfer limitations and thereby allows the reaction to more closely approach kinetic limitations. When reaction rates are accelerated, residence times may be decreased, thereby increasing obtainable throughput. Alternatively, where the current yield is acceptable, decreasing the required residence time allows for the use of lower temperatures and/or pressures than conventional processes. Alternatively or additionally, yield of product may be increased via the high shear system and process. In some cases, it may be possible to reduce the reactor size while maintaining the same product yield due to the use of a high shear mixer.

System for Production of Starch

Figure 1:
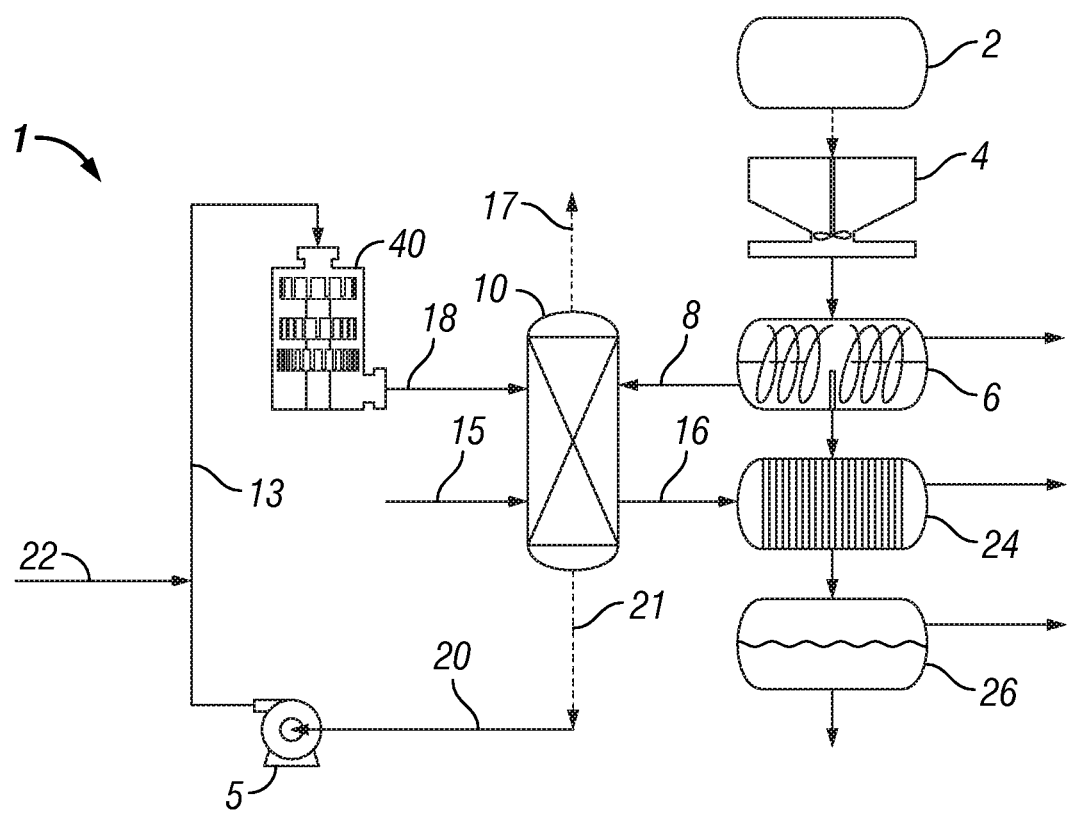
FIG. 1 is a process flow diagram for a high shear process for production of starch, in accordance with an embodiment of the invention.

The high shear starch production system will now be described in relation to FIG. 1, which is a process flow diagram showing an embodiment of a high shear system 1 for the production of starch from corn kernels. The basic components of the system include external high shear mixing device (HSD) 40, vessel or reactor 10, and pump 5. As shown in FIG. 1, the high shear device is located external to vessel/reactor 10. Each of these components is described in more detail below. Line 20 is connected to pump 5 for introducing a liquid stream containing an aqueous corn slurry. Line 13 connects pump 5 to HSD 40, and line 18 connects HSD 40 to vessel 10. Line 22 is connected to line 13 for introducing sulfur dioxide gas, or a solution containing dissolved sulfur dioxide. Line 17 is connected to vessel 10 for removal of vent gas. Additional components or process steps may be incorporated between vessel 10 and HSD 40, or ahead of pump 5 or HSD 40, if desired.

A grinder 4 is configured for cracking the corn kernels and loosening the hulls to provide a grist of the desired particle size. The grinder 4 may be a conventional dry-type or a wet-type grinder, depending on whether a pre-soaking tank 2 is attached. In FIG. 1 the arrow from pre-soaking tank 2 is drawn with a dashed line to indicate that the use of tank 2 is optional in some applications. A conventional germ and hull separator 6 is configured for separating out the lighter hulls of the corn and for delivering the denser corn grist to vessel 10. Line 8 joins separator 6 to vessel 10. Outlet line 16 from vessel 10 is configured for attaching to a screening assembly 24, which is followed by a starch-gluten separator 26. At least one inlet line 15 is coupled to vessel 10 for introducing water, bisulfite solution, or other materials.

High Shear Mixing Device.

Referring still to FIG. 1, external high shear mixing device (HSD) 40, also sometimes referred to as a high shear mixer, is positioned between pump 5 and reactor 10 and is configured for receiving an inlet stream via line 13. Alternatively, system 1 may be configured with more than one inlet line (not shown). For instance, HSD 40 may be configured for separately receiving corn grist slurry and sulfur dioxide via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generators comprising a rotor/stator combination, each of which has a fixed gap between the stator and rotor. HSD 40 is configured to produce a dispersion containing submicron—(i.e., less than one micron in diameter) and micron-sized bubbles containing $SO_2$ gas dispersed in an aqueous medium flowing through the mixing device. In some embodiments, HSD 40 is also configured in such a way that it is capable of producing a dispersion containing submicron—(i.e., less than one micron in diameter) and micron-sized corn particles dispersed in an aqueous medium flowing through the mixer. The high shear mixer comprises an enclosure or housing so that the pressure and temperature of the mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or dispersions with particle or bubble sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the 0-1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills, which are classified as intermediate energy devices. A typical colloid mill configuration includes a conical or disk rotor that is separated from a complementary, liquid-cooled stator by a closely-controlled rotor-stator gap, which is commonly between 0.0254 and 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

An approximation of energy input into the fluid (kW/L/min) can be estimated by measuring the motor energy (kW) and fluid output (L/min). Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (in meters, for example) times the frequency of revolution (in revolutions per minute). A colloid mill, for example, may have a tip speed in excess of 22.9 m/sec (4500 ft/min) and may exceed 40 m/sec (7900 ft/min). For the purposes of this disclosure, the term "high shear" refers to mechanical rotor stator devices (e.g., colloid mills or rotor/stator mixers) that are capable of tip speeds in excess of 5.1 m/sec. (1000 ft/min) and require an external mechanically driven power device to drive energy into the stream of materials to be reacted. For example, in HSD 40, a tip speed in excess of 22.9 m/sec (4500 ft/min) is achievable, and may exceed 40 m/sec (7900 ft/min). In some embodiments, HSD 40 is capable of delivering at least 300 L/h with a power consumption of about 1.5 kW at a nominal tip speed of at least 22.9 m/sec (4500 ft/min).

HSD 40 combines high tip speeds with a very small shear gap to produce significant shear on the material being processed. The amount of shear will be dependant on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases these local pressure and temperature elevations may persist for nano or pico seconds. In some embodiments, the energy expenditure of the high shear mixer is greater than 1000 W/m³. In embodiments, the energy expenditure of HSD 40 is in the range of from about 3000 W/m³ to about 7500 W/m³. The shear rate is the tip speed divided by the shear gap width (minimal clearance between the rotor and stator). The shear rate generated in HSD 40 may be greater than 20,000 $s^{-1}$. In some embodiments the shear rate is at least 1,600,000 $s^{-1}$. In embodiments, the shear rate generated by HSD 40 is in the range of from 20,000 $s^{-1}$ to 100,000 $s^{-1}$. For example, in one application the rotor tip speed is about 40 m/sec (7900 ft/min) and the shear gap width is 0.0254 mm (0.001 inch), producing a shear rate of 1,600,000 $s^{-1}$. In another application the rotor tip speed is about 22.9 m/sec (4500 ft/min) and the shear gap width is 0.0254 mm (0.001 inch), producing a shear rate of about 902,000 $s^{-1}$.

In some embodiments, HSD 40 comprises a colloid mill Suitable colloidal mills are manufactured by IKA® Works, Inc. Wilmington, N.C. and APV North America, Inc. Wilmington, Mass., for example. In some instances, HSD 40 comprises the DISPAX REACTOR® of IKA® Works, Inc. Several models are available having various inlet/outlet connections, horsepower, nominal tip speeds, output rpm, and nominal flow rate. Selection of a particular device will depend on specific throughput requirements for the intended application, and on the desired bubble or particle size in the outlet dispersion from the high shear mixer. In some embodiments, selection of the appropriate mixing tools (generators) within HSD 40 allows for corn flour or grit size reduction and increase in particle surface area.

The high shear device comprises at least one revolving element that creates the mechanical force applied to the reactants. The high shear device comprises at least one stator and at least one rotor separated by a clearance. For example, the rotors may be conical or disk shaped and may be separated from a complementary-shaped stator; both the rotor and stator may comprise a plurality of circumferentially-spaced teeth. In some embodiments, the stator(s) are adjustable to obtain the desired gap between the rotor and the stator of each generator (rotor/stator set). Grooves in the rotor and/or stator may change directions in alternate stages for increased turbulence. Each generator may be driven by any suitable drive system configured for providing the necessary rotation.

In some embodiments, the minimum clearance between the stator and the rotor is in the range of from about 0.0254 mm to about 3.175 mm (about 0.001 inch to about 0.125 inch). In certain embodiments, the minimum clearance between the stator and rotor is about 1.524 mm (0.060 inch). In certain configurations, the minimum clearance between the rotor and stator is at least 1.778 mm (0.07 inch). The shear rate produced by the high shear mixer may vary with longitudinal position along the flow pathway. In some embodiments, the rotor is set to rotate at a speed commensurate with the diameter of the rotor and the desired tip speed. In some embodiments, the colloidal mill has a fixed clearance between the stator and rotor. Alternatively, the colloid mill has adjustable clearance.

In some embodiments, HSD 40 comprises a single stage dispersing chamber (i.e., a single rotor/stator combination, a single generator). In some embodiments, high shear device 40 is a multiple stage inline colloid mill and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which varies proportionately with tip speed and inversely with rotor/stator gap) varies with longitudinal position along the flow pathway, as further described herein below.

In some embodiments, each stage of the external high shear device has interchangeable mixing tools, offering flexibility. For example, the DR 2000/4 DISPAX REACTOR® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired particle size. In some embodiments, each of the stages is operated with super-fine generator. In some embodiments, at least one of the generator sets has a rotor/stator minimum clearance of greater than about 5.08 mm (0.20 inch). In some embodiments, at least one of the generator sets has a minimum rotor/stator clearance of greater than about 1.778 mm (0.07 inch). In some embodiments the rotors are 60 mm and the are stators are 64 mm in diameter, providing a clearance of about 4 mm.

Figure 2:
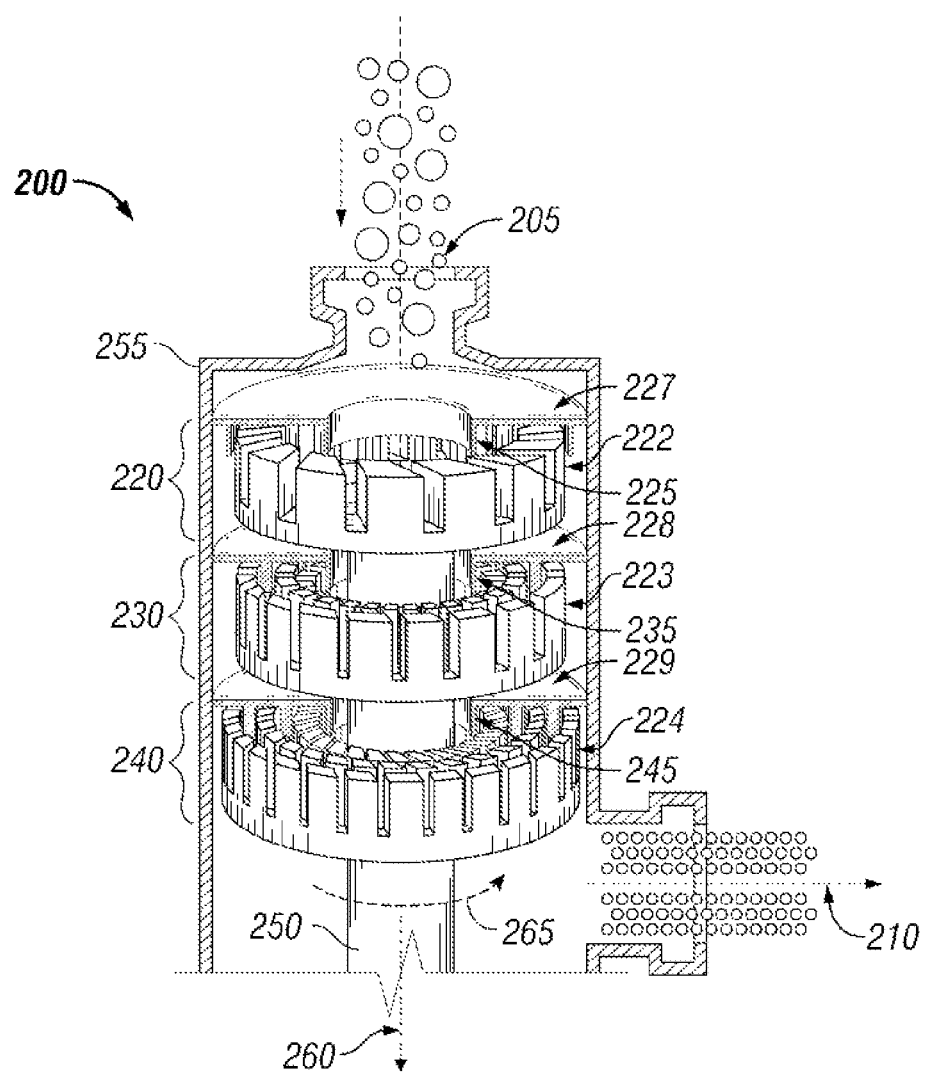
FIG. 2 is a longitudinal cross-section view of a multi-stage high shear device, as employed in an embodiment of the system of FIG. 1.

Referring now to FIG. 2, there is presented a longitudinal cross-section of a suitable high shear device 200. High shear device 200 is a dispersing device comprising three stages or rotor-stator combinations, 220, 230, and 240. Three rotor/stator sets or generators 220, 230, and 240 are aligned in series along drive input 250. The first generator 220 comprises rotor 222 and stator 227. The second generator 230 comprises rotor 223, and stator 228; the third generator 240 comprises rotor 224 and stator 229. For each generator the rotor is rotatably driven by input 250 and rotates, as indicated by arrow 265, about axis 260. Stator 227 is fixedly coupled to high shear device wall 255. Each generator has a shear gap which is the distance between the rotor and the stator. First generator 220, comprises a first shear gap 225; second generator 230 comprises a second shear gap 235; and third generator 240 comprises a third shear gap 245. In some embodiments, shear gaps 225, 235, 245 are between about 0.025 mm and 10.0 mm wide. In some embodiments, the process comprises utilization of a high shear device 200 wherein the gaps 225, 235, 245 are between about 0.5 mm and about 2.5 mm. In certain instances the gap is maintained at about 1.5 mm. Alternatively, the gaps 225, 235, 245 are different for generators 220, 230, 240. In certain instances, the gap 225 for the first generator 220 is greater than about the gap 235 for the second generator 230, which is in turn greater than about the gap 245 for the third generator. As mentioned above, the generators of each stage may be interchangeable, offering flexibility.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. Rotors 222, 223, and 224 may comprise a number of rotor teeth circumferentially spaced about the circumference of each rotor. Stators 227, 228, and 229 may comprise a complementary number of stator teeth circumferentially spaced about the circumference of each stator. In some embodiments, the inner diameter of the rotor is about 11.8 cm. In embodiments, the outer diameter of the stator is about 15.4 cm. In certain embodiments, each of three stages is operated with a super-fine generator, comprising a shear gap of between about 0.025 mm and about 3 mm. For applications in which solid particles line corn flour or grit are to be sent through high shear device 200, shear gap width may be selected for reduction in particle size and increase in particle surface area. In some embodiments, the disperser is configured so that the shear rate will increase stepwise longitudinally along the direction of the flow. The IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2HP power, output speed of 7900 rpm, flow capacity (water) approximately 300-700 L/h (depending on generator), a tip speed of from 9.4-41 m/sec (1850 ft/min to 8070 ft/min).

Reactor/Vessel.

Vessel or reactor 10 is any type of vessel in which an aqueous slurry of grist can be prepared and subsequently removed to pump 5. For instance, vessel 10 may be a continuous or semi-continuous stirred tank reactor, or it may comprise one or more batch reactors arranged in series or in parallel. One or more line 15 may be connected to vessel 10 for introducing the water, bisulfite solution, or other material. Vessel 10 may include one or more of the following items: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger. Line 16 is connected to vessel 10 for removal of the starch product.

Heat Transfer Devices.

In addition to the above-mentioned heating/cooling capabilities of vessel 10, other external or internal heat transfer devices for heating or cooling a process stream are also contemplated in variations of the embodiments illustrated in FIG. 1. Some suitable locations for one or more such heat transfer devices are between pump 5 and HSD 40, between HSD 40 and vessel 10, and between vessel 10 and pump 5 when system 1 is operated in multi-pass mode. Some non-limiting examples of suitable heat transfer devices are shell, tube, plate, and coil heat exchangers, as are known in the art.

Pump.

Pump 5 is configured for either continuous or semi-continuous operation, and may be any suitable pumping device that is capable of providing greater than 203 kPa (2 atm) pressure, preferably greater than 3 atm pressure, to allow controlled flow through HSD 40 and system 1. For example, a Roper Type 1 gear pump, Roper Pump Company (Commerce Georgia) Dayton Pressure Booster Pump Model 2P372E, Dayton Electric Co (Niles, Ill.) is one suitable pump. Preferably, all contact parts of the pump comprise stainless steel. If corrosive substances are to be pumped it may be desirable to provide gold plated contact surfaces. In some embodiments of the system, pump 5 is capable of pressures greater than about 2027 kPa (20 atm). In addition to pump 5, one or more additional, high pressure pump (not shown) may be included in the system illustrated in FIG. 1. For example, a booster pump, which may be similar to pump 5, may be included between HSD 40 and vessel 10 for boosting the pressure into vessel 10. As another example, a supplemental feed pump, which may be similar to pump 5, may be included in line 15 for introducing additional water, or bisulfite solution into vessel 10. Line 21 connects vessel 10 to line 20 for introducing the initial corn slurry into HSD 40 via pump 5 and line 13, or for multi-pass operation, as further described herein below. As still another example, a compressor type pump may be positioned between line 17 and HSD 40 for recycling $SO_2$ gas from vessel 10 to an inlet of the high shear device.

Production of Starch from Corn Grist

With reference to FIG. 1, when the system 1 is used to produce starch, the desired quantity of ground corn kernels (referred to as grist) and water are first combined in vessel 10, which may be a batch reactor or any other suitable vessel, to form a slurry. The grist may be prepared by conventional wet or dry grinding techniques in grinder 4 to coarsely grind the kernels to break the germ loose from other components. Grist is in the form of a meal or flour, depending on how coarsely it is ground. For example, the mean particle size of the grist may be about 2 millimeters in some applications, when it is initially introduced to vessel 10. For some applications, especially when a more highly refined starch product is desired (i.e., containing minimal residual protein), it is preferred to grind the corn kernels in such a manner that the hulls are fractured without damaging the germ (e.g., using approximately 3-4 millimeter roller clearances). For some applications, the corn kernels are pre-soaked in water (in tank 2) prior to wet grinding in grinder 4. A relatively brief soaking (e.g., about 1-6 hours) in water is employed to soften the kernels, allowing the germ to become hydrated and pliable enough to resist fracturing and breaking during coarse grinding.

Using known wet or dry milling techniques, the ground corn is separated to provide a grist containing coarse or fine particles that are substantially free of the hull and germ. The starch-containing grist is fed via line 8 from separator 6 into vessel 10 where it is mixed with water to form a slurry. In some applications the slurry contains about 10-40 wt % grist. The temperature of the slurry in vessel 10 may be controlled using any suitable known method. For example, the reaction stream may be maintained at a specified reaction temperature, using cooling coils in vessel 10 to maintain reaction temperature. The use of additional external heating and/or cooling heat transfer devices is also contemplated in some applications of the process. For some applications, reactor 10 may primarily serve to cool/hold the initial corn grist slurry, as much or a substantial portion of the starch extraction from the corn grist occurs in HSD 40 and during transit through system 1, as further described below.

In lieu of a traditional steeping stage, the slurry in reactor 10 flows through lines 21 and 20 to pump 5 and line 13, which delivers the slurry to high shear HSD 40. Potential advantages of eliminating the traditional steeping stage of the process is the reduced opportunity for microbial growth and avoidance of the loss or the need to recover any starch that is released into the steep water. Pump 5 is operated to pump the liquid stream (i.e., corn slurry) from reactor/vessel 10, via lines 21 and 20, and to build pressure and feed HSD 40, providing a controlled flow through line 13 and high shear mixer (HSD) 40, and throughout high shear system 1. In some embodiments, pump 5 increases the pressure of the liquid stream to greater than 203 kPa (2 atm), preferably greater than about 304 kPa (3 atm). In some applications, pressures greater than about 2027 kPa (20 atm) may be used to accelerate reactions, with the limiting factor being the pressure limitations of the selected pump 5 and HSD 40. In many embodiments, it is preferred to keep the pressure high enough throughout system 1 to keep the $SO_2$ in solution. For the purposes of this disclosure, the terms "superficial pressure" and "superficial temperature" refer to the apparent, bulk, or measured pressure or temperature, respectively, in a vessel, conduit or other apparatus of the system. The actual temperatures and/or pressures at which the components make contact and interact in the microenvironment of a transient cavity produced by the hydrodynamic forces of the high shear mixer may be quite different, as further discussed elsewhere herein.

Gaseous $SO_2$ is injected via line 22 into feed line 13 as the aqueous corn slurry flows into HSD 40, where the components are subjected to high shear mixing. Additional water may be introduced into line 13, or, in some embodiments, additional water may be introduced independently into HSD 40. Alternatively, or additionally, in some circumstances it may be desirable to initially dissolve a portion of the desired amount of sulfur dioxide in the corn slurry in vessel 10 prior to withdrawing the slurry via line 21 and transferring it to HSD 40 via lines 20 and 13, so that the aqueous slurry contains a corresponding amount of bisulfite ions when it initially enters HSD 40. In this case, additional $SO_2$ gas may be introduced into the bisulfite-containing stream via line 22 if necessary for a particular application.

After pumping, the corn flour slurry stream 13 mixes with sulfur dioxide gas 22 in HSD 40, which serves to create fine mixture, emulsion or dispersion of the corn flour, sulfur dioxide gas, and aqueous bisulfite solution. The high shear mixing of the slurry components exposes particle surfaces for more intensive hydration and to facilitate chemical reactions with the dissolved $SO_2$ and with the emulsified gaseous $SO_2$, to enhance the release of starch and gluten from the fiber matrix in the particles.

As used herein, the term "dispersion" refers to a liquefied mixture that contains two distinguishable substances (or phases) that will not readily mix and dissolve together. A dispersion comprises a continuous phase (or matrix), which holds therein discontinuous globules, droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. The term "dispersion" encompasses continuous liquid phases throughout which gas bubbles are distributed, continuous liquid phases throughout which solid particles (e.g., corn flour particles) are distributed, continuous phases of a first liquid throughout which droplets of a second liquid that is substantially insoluble in the continuous phase are distributed, and liquid phases throughout which any one or a combination of solid particles, immiscible liquid globules or droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

In the instant process, the $SO_2$ gas is highly dispersed such that nanobubbles and microbubbles of $SO_2$ are formed which enhance dissolution of the $SO_2$ into the aqueous medium. In some applications, the amount of dissolved $SO_2$ (sulfite) in the dispersion is no more than about 1-2 wt %, or a specific pH (e.g., 2.5).

In HSD 40, the corn slurry and $SO_2$ are highly dispersed such that nano- and micro-bubbles containing $SO_2$, together with finely dispersed particles of corn, are formed for superior dissolution into solution and/or enhancement of intimate mixing. For example, disperser IKA® model DR 2000/4, a high shear, three stage dispersing device configured with three rotors in combination with stators, aligned in series, is used to create a dispersion of dispersible $SO_2$ in aqueous medium comprising the corn particles and dissolved $SO_2$. The rotor/stator sets may be configured as illustrated in FIG. 2, for example. For some applications, the direction of rotation of the generators may be opposite that shown by arrow 265 (e.g., clockwise or counterclockwise about axis of rotation 260). The combined reactants entering the high shear mixer via line 13 proceed to a first stage rotor/stator combination having circumferentially spaced first stage shear openings. In some applications, the direction of flow of the reactant stream entering inlet 205 corresponds to the axis of rotation 260. The coarse dispersion exiting the first stage enters the second rotor/stator stage, having second stage shear openings. The reduced particle-size dispersion emerging from the second stage enters the third stage rotor/stator combination having third stage shear openings.

In some embodiments, the shear rate increases stepwise longitudinally along the direction of the flow. For example, in some embodiments, the shear rate in the first rotor/stator stage is greater than the shear rate in subsequent stage(s). In other embodiments, the shear rate is substantially constant along the direction of the flow, with the stage or stages being the same. If the high shear mixer includes a PTFE seal, for example, the seal may be cooled using any suitable technique that is known in the art. For example, the slurry stream flowing in line 13 may be used to cool the seal and in so doing be preheated as desired prior to entering the high shear mixer.

The rotor of HSD 40 is set to rotate at a speed commensurate with the diameter of the rotor and the desired tip speed. As described above, the high shear mixer (e.g., colloid mill) has either a fixed clearance between the stator and rotor or has adjustable clearance. HSD 40 serves to intimately mix $SO_2$ gas and corn particles with the liquid phase (e.g., water and dissolved $SO_2$). In some embodiments of the process, the transport resistance of the slurry components is reduced by operation of the high shear mixer such that the velocity of the reaction is increased by greater than a factor of 5. In some embodiments, the velocity of the reaction is increased by at least a factor of 10. In some embodiments, the velocity is increased by a factor in the range of about 10 to about 100 fold. In some embodiments, HSD 40 delivers at least 300 L/h with a power consumption of 1.5 kW at a nominal tip speed of at least 22.9 m/sec (4500 ft/min), and which may exceed 40 m/sec (7900 ft/min). Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 5000 kPa (500 kg/cm$^2$) under cavitation conditions. The high shear mixing results in dispersion of the corn particles and the $SO_2$ bubbles as micron or submicron-sized bubbles (i.e., mean diameter less than one micron). In some embodiments, the resultant dispersion has an average bubble size less than about 1.5 μm. In some embodiments, the mean bubble size is less than one micron in diameter. Accordingly, the dispersion exiting HSD 40 via line 18 comprises micron and/or submicron-sized gas-filled bubbles. In some embodiments, their mean size is in the range of about 0.4 μm to about 1.5 μm. In some embodiments, the mean size is less than about 400 nm, in the range of about 200 nm to about 400 nm, or is about 100 nm in some cases. In some embodiments, the sizes of the particles or bubbles in the dispersed phase are less than 1000 nanometers (i.e., submicron or <1 micron in diameter). It is known in emulsion chemistry that sub-micron particles or bubbles dispersed in a liquid undergo movement primarily through Brownian motion effects. Without being limited to a specific theory to explain certain features or benefits of the present methods, it is proposed that sub-micron gas particles created by the high shear mixer have greater mobility thereby facilitating and accelerating at least the hydration reaction through greater transport of water and chemical components. In many embodiments, the dispersion is able to remain dispersed at atmospheric pressure for at least 15 minutes.

Once dispersed, the resulting dispersion exits high shear mixer 40 via line 18. Extraction and solubilization of starch will occur whenever suitable time, temperature and pressure conditions exist, facilitated by the presence of the dissolved and emulsified $SO_2$. In this sense, the extraction and solubilization of starch may occur at any point in the flow diagram of FIG. 1 where temperature and pressure conditions are suitable. In some embodiments, a significant portion of the hydration, extraction and dissolution of starch takes place in the high shear mixer. A discrete reaction vessel (reactor 10) is usually desirable, however, to allow for increased residence time, agitation and heating and/or cooling. Accordingly, the output from HSD 40 feeds into vessel 10, as illustrated in FIG. 1, wherein starch extraction and solubilization occurs or continues to take place. If desired, the dispersion may be further processed prior to entering vessel 10. For example, further mixing in one or more successive high shear mixing devices, similar to HSD 40 with the same or different generator configurations, may be performed, before the process stream enters reactor/vessel 10.

After the highly dispersed mixture is fed into reactor 10 via line 18, starch release into the slurry may continue to take place. The dispersion may be allowed to stand in vessel 10 for a selected time to permit at least some settling of the solids and release of suspended $SO_2$ gas bubbles. The temperature of the dispersion in reactor 10 may be appropriately controlled. Vent gas may exit vessel 10 via line 17. Vent gas stream 17 may comprise $SO_2$ and other volatile compounds, for example. If desired, the vent gas stream 17 may be further treated to absorb the $SO_2$ or it may be recovered for recycle to the process using techniques that are known. In some instances, it may be desirable to use a compressor type pump to recycle vent gases in line 17 back into HSD 40.

For some applications of a high shear process, a superficial pressure of less than about 600 kPa and a superficial temperature less than about 200° C. is maintained in at least the high shear mixing device and reactor of system 1. For the purposes of this disclosure, the terms "superficial pressure" and "superficial temperature" refer to the apparent or measured pressure or temperature, respectively, in a vessel, conduit or apparatus of the starch production system. The actual temperatures and/or pressures at which the reactants make contact and react in the microenvironment of a transient cavity produced by the hydrodynamic forces of the high shear mixer may be quite different.

In various applications, starch production is carried out as a multi-pass, continuous flow process or as a single-pass or batch process. Accordingly, the starch product may be produced either continuously, semi-continuously or batch wise, as desired. The product stream comprising extracted, solubilized starch and fully or partially extracted corn particles, and extracted gluten protein exits vessel 10 by line 16. In some embodiments, a plurality of reactor product lines 16 are used to remove the product. In instances in which a single pass or "once through" process is desired, the use of only a single high shear mixer or a group of multiple high shear mixers in parallel arrangement may be preferred in order to avoid subjecting the extracted starch and protein molecules to excessive shear forces.

Multiple Pass Operation.

Referring still to FIG. 1, the system is configured for either single pass or multi-pass operation, wherein, after the initial preparation of the corn slurry in vessel 10 and commencement of the process, the output from line 16 of vessel 10 goes directly to recovery of the starch product or to further processing, as described below. In some embodiments it may be desirable to pass the contents of vessel 10, or a portion thereof containing fresh and/or incompletely extracted corn particles, through HSD 40 during a second pass. In this case, the dispersion and the initially solubilized starch may be returned via lines 21 and 20, pump 5, and line 13, to HSD 40, for further dispersion and reaction. Additional $SO_2$ may be injected via line 22 into line 13, or it may be added directly into the high shear mixer, if needed. Additional water may be injected at line 13, if needed. In some multi-pass embodiments, it is preferred to provide for extraction of protein and oil fractions between passes through the high shear mixer(s). For example, some embodiments may utilize a series of high shear mixing devices with progressively lower shear gaps, and provide for intervening separation of the germ protein and oil, as needed. In such embodiments, the output from line 16 is screened and separated to remove protein (e.g., gluten) and oil from the particulates, which can then be returned as a slurry to HSD 40.

Alternatively, in some embodiments, two or more high shear devices like HSD 40, or differently configured devices, are aligned in series, and are used to further enhance the reaction. Their operation may be in either batch or continuous mode. In some instances in which a single pass or "once through" process is desired, the use of multiple high shear devices in series may also be advantageous. For instance, in some applications, where shorter starch molecules are desired, the product may be recycled via lines 21 and 20, to pump 5, and through high shear mixer 40, before returning via line 18 to vessel 10.

After the desired processing, the resulting starch-gluten intermediate product is removed from system 1 via line 16 to screen assembly 24 and from there to starch-gluten separator 26. Suitable screening and separator apparatus are known in the art. In some embodiments, a plurality of outlet lines similar to line 16 are used to remove the starch-gluten intermediate. In screen assembly 24 the resulting dispersion, containing starch, gluten and fiber, flows over screens that catch fiber but allow starch and gluten to pass through. The resulting starch-gluten mixture (mill starch), is transferred to one or more starch separator 26, which may be a centrifuge or other suitable device, wherein the starch fraction is separated. Because gluten has a lower density than starch, the gluten can be centrifuged out of the starch fraction. If desired, further washing may be done to remove residual protein. The recovered starch may be dried, further processed to obtain derivative products, or it may be used directly as a feedstock to a selected downstream process, such as manufacturing of drilling mud.

The application of enhanced mixing of the reactants by HSD 40 potentially causes greater extraction and solubilization of starch in some embodiments of the process. In some embodiments, the enhanced mixing potentiates an increase in throughput of the process stream. In some embodiments, the high shear mixing device is incorporated into an established starch extraction process, thereby causing an increase in production (i.e., greater throughput). Without wishing to be limited to a particular theory, it is believed that the level or degree of high shear mixing is sufficient to increase rates of mass transfer and may also produce localized non-ideal conditions that enable reactions to occur that might not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods is operated under what is believed to be cavitation conditions effective to dissociate some reactants into free radicals which then react.

Potential benefits of various embodiments of the present systems and methods for the production of starch include, but are not limited to, faster cycle times, increased throughput, higher extraction and solubilization rates, reduced operating costs and/or reduced capital expense due to the possibility of designing smaller reactors and/or operating the process at lower temperature and/or pressure. In some embodiments, use of the disclosed process comprising reactant mixing via external high shear mixing device 40 allows greater yield of starch and/or an increase in throughput of the reactants. In some embodiments, the method comprises incorporating external high shear mixer into an established starch production plant, thereby making possible an increase in production (greater throughput) compared to a similar process operated without an external high shear mixer. In some embodiments, a disclosed process or system makes possible the design of a smaller and/or less capital intensive process than previously possible without the incorporation of an external high shear mixer.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, although extraction of starch from corn (*Zea mays*) is discussed in particular, it should be understood that the same or similar processes are applicable to other starting materials as well, including but not limited to, various cereal and root materials including milo, sorghum, wheat, rice, arrowroot, beet, potato and tapioca. "Corn" is considered to be representative of such other suitable source materials for production of starch.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, it should be understood that the scope of protection is not limited by the description set out above but is only limited by the claims which follow, that scope including all equivalents of the subject matter of the claims. Each and every original claim is incorporated into the specification as an embodiment of the invention. Thus, the claims are a further description and are an addition to the preferred embodiments of the invention. The disclosures of all patents, patent applications, and publications cited herein are hereby incorporated by reference, to the extent they provide exemplary, procedural or other details supplementary to those set forth herein.

What is claimed is:

1. A method for producing starch, the method comprising: combining dehulled and degermed corn kernel particles, sulfur dioxide, and an aqueous medium and subjecting the combination to high shear within a high shear mixing device to form a high shear mixture comprising submicron-sized corn kernel particles dispersed in said aqueous medium, wherein said high shear mixing device comprises at least one generator comprising a rotor and a complementarily-shaped stator, thus causing the extraction of starch from said dispersed particles and solubilization of said starch in said aqueous medium; and separating starch from said high shear mixture.

2. The method of claim 1, wherein forming said high shear mixture comprises subjecting said combination to a shear rate in the range of from 20,000 $s^{-1}$ to 1,600,000 $s^{-1}$.

3. The method of claim 1, wherein said rotor comprises a rotor tip, and wherein forming said high shear mixture comprises subjecting said combination to a rotor tip speed in the range of from about 9.4 msec to about 40 msec.

4. The method of claim 3, wherein said tip speed is in the range of from about 22.9 msec to about 40 m/sec.

5. The method of claim 1, wherein separating at least a portion of the starch occurs in a vessel that is separate from said high shear mixing device.

6. The method of claim 1 further comprising processing said high shear mixture in a second generator to reduce the average size of particles in said high shear mixture prior to extracting.

7. The method of claim 6 wherein the second generator is within the high shear mixing device.

8. The method of claim 6 wherein the second generator is within another high shear mixing device.

9. The method of claim 6 wherein the shear rate provided by one generator is different from the shear rate provided by the other generator.

10. The method of claim 1 carried out in batch mode of operation.

11. The method of claim 1 carried out in continuous mode of operation.

12. The method of claim 1 wherein separating comprises introducing the high shear mixture into a starch-gluten separator configured for separating said starch from a product comprising gluten.

13. The method of claim 1 wherein the combination consists essentially of an aqueous solution of sulfur dioxide and dehulled and degermed corn kernel particles.

14. The method of claim 1 wherein the high shear mixing device comprises at least three generators.

15. The method of claim 1 wherein the high shear mixing device produces an output speed of about 7900 rpm.

16. The method of claim 1 wherein the rotor and the stator comprise teeth.

17. The method of claim 1 wherein the combination comprises from about 10 to about 40 wt % dehulled and degermed corn kernel particles.

18. The method of claim 1 wherein the high shear mixture is acidic.

19. The method of claim 18 wherein the high shear mixture has a pH of about 2.5.

20. The method of claim 1 wherein the high shear mixture comprises from about 1 wt % to about 2 wt % dissolved sulfur dioxide.

21. The method of claim 1 wherein the mean diameter of the corn kernel particles in the high shear mixture is in the range of from about 0.1 μm to about 0.4 μm.

* * * * *